United States Patent [19]

Foshee

[11] Patent Number: 4,663,839

[45] Date of Patent: May 12, 1987

[54] CABINET LOCK

[75] Inventor: William R. Foshee, Indianapolis, Ind.

[73] Assignee: Best Lock Corporation, Indianapolis, Ind.

[21] Appl. No.: 733,197

[22] Filed: May 13, 1985

Related U.S. Application Data

[62] Division of Ser. No. 448,477, Dec. 10, 1982, Pat. No. 4,531,389.

[51] Int. Cl.⁴ .............................................. B23P 19/00

[52] U.S. Cl. ...................................... 29/804; 29/243.5; 29/275

[58] Field of Search .................... 29/804, 243.5, 283.5, 29/275, 254, 509; 72/476, 479, 462; 70/372, 373, 385, 369

[56] References Cited

U.S. PATENT DOCUMENTS

| | | | |
|---|---|---|---|
| 2,138,404 | 11/1938 | Haas | 29/509 |
| 2,881,646 | 4/1959 | Farr et al. | 29/243.5 |
| 3,176,488 | 4/1965 | Jacobi | 70/373 |
| 3,425,115 | 2/1969 | Handwerk et al. | 29/243.5 X |
| 4,095,327 | 6/1978 | Hartmann | 29/509 |

*Primary Examiner*—Frederick R. Schmidt
*Assistant Examiner*—Steven P. Schad
*Attorney, Agent, or Firm*—Barnes & Thornburg

[57] ABSTRACT

A cabinet push lock has a key plug held by a retaining pin engaged in a circumferential groove in the key plug and mounted in a bore coplanar with the pin tumbler bores. The pin tumbler stacks are held in their bores by an elongated cap mounted in a groove closed at the front and extending across both the pin tumbler bores and the retaining pin bore. The cap is held against endwise movement, as by interlocking with the sides of the groove. The groove side walls are staked at spaced areas to releasably retain the cap, and other areas are reserved for subsequent restakings. The retaining pin bore, an aligned diametric bore in the key plug, and a bottom opening in the lock body provide a passage for transmission of thrust to drive a portion of the cap out of the groove to permit cap removal. The diametric bore in the key plug contains a drive pin to block the key slot, and a key stop ahead of the drive pin blocks an additional portion of the key slot. Cap-removing thrust is exerted by driving the drive pin against the retaining pin and thereby driving the retaining pin against the overlying portion of the cap. A capping tool is provided to control the swaging so as to permit repeated recappings and have easy and repeated recombinatings of the lock.

15 Claims, 6 Drawing Figures

CABINET LOCK

This is a division of application Ser. No. 06/448,477 filed Dec. 10, 1982 now U.S. Pat. No. 4,531,389.

This invention relates to a cabinet lock, and more particularly to a cabinet push lock which is adapted to be easily and repeatedly recombinated.

In many cases, it is desirable to combinate a cabinet push lock in a lock system in which the other locks comprise key-removable cores and which can be recombinated by simply removing the existing cores and replacing them by differently combinated cores. Industry standard cabinet push locks, and especially the standard openings and fittings provided on cabinets, are too small to permit the use of standard key-removable cores, and it has not been possible to readily recombinate standard size cabinet push locks in keeping with core changes of the other locks of a system or particular portion of a lock system.

The present invention provides a cabinet push lock mechanism of standard size to fit standard openings and interact with standard fittings, and which also permits relatively easy recombination of the lock, repeatedly at least sufficient times to satisfy normal requirements.

In accordance with the invention, a cabinet lock or the like comprises an elongated lock body which may have the standard oval cross section adapted to fit a standard opening in a file cabinet or the like. The body has a key plug bore extending longitudinally in its lower portion, and a series of pin tumbler bores extending from the key plug bore in a common plane to a surface such as the top rounded surface of the body. Such surface is formed with a cap-receiving groove crossing the open upper ends of the pin tumbler bores, and an elongated cap is received in such groove for closing the outer ends of the pin tumbler bores and retaining therein the pin segments and their biasing springs. The groove has side walls of greater height than the adjacent edges of the cap, and such walls are staked into retaining engagement with such edges at a plurality of points along the length of the groove, preferably at spaced areas along such length. Desirably, the staking is limited so as to permit subsequent release and re-staking of a cap at the same areas, and the intervening areas provide for staking in additional subsequent combinating operations. To facilitate removal of the cap for recombinating, the body includes a cap-release passage which terminates in the groove below the cap and is adapted for the reception of means to force at least a portion of the cap out of the groove so as to permit removal of the cap to expose the bores for recombination.

The key plug bore in the standard-size lock body can be and desirably is of the same diameter as the key plug of a standard key-removable core so as to take the same size key. In the present cabinet lock, the key plug carries a crank pin at its rear end, arranged in a conventional manner to retract a bolt mounted in the body in the same plane with the series of pin tumbler bores, and biased upward to project above the top surface of the body. To retain the key plug in its bore, it is formed with a circumferential groove adjacent its rear end, and is held against axial movement in its bore by a retaining pin mounted in a bore between the pin tumbler bores and the bolt and in the same plane.

In accordance with the present invention, the cap-receiving groove is closed at its front end and it and the cap extend to the position of the bolt and over the end of the key plug retaining pin. The cap is thus trapped against longitudinal movement between the closed front end of the groove and the bolt. It is desirably also locked against such movement and oriented in its groove by interlocking engagement with the sides of the groove. The bore containing the key plug retaining pin desirably forms part of the cap-release passage. Such passage is continued by way of a diametric bore through the key plug at the bottom of the retainer groove, and a hardened drive pin may be mounted in such diametric bore. An access opening in the bottom of the lock body in alignment with the retainer pin bore and such drive pin bore completes the cap-release passage and permits the insertion of a tool to drive the drive pin upward against the retainer pin, and thereby drive the retainer pin upward against the cap to release at least the overlying portion of such cap from the groove in which it is mounted.

The drive pin in the key plug desirably intersects and is coplanar with the key slot so that it serves to block that key slot against the insertion of a pick or other tool for actuating the bolt otherwise than by its intended key.

Preferably, a key stop is provided in the key plug between the series of pin tumbler bores and the diametric drive pin, which key stop not only provides a key-stopping function but also lies across the projected area of the plug retainer groove and across the portion of the key slot not occupied by the blocker drive pin, so as to further block access to the bolt by a picking tool. The key stop is desirably in the form of a C-shaped snap-ring which is received in a narrow groove in the key plug and which has a detent boss engaged in the key slot to orient the snap-ring in its groove.

In further accordance with the present invention, a capping tool is provided comprising a capping block adapted to receive a combinated lock body with its cap loosely in place in or over the cap-receiving groove. Such capping block has a series of spaced guideways for the reception of a shaped punch having a central land to engage the cap and seat it in the groove and having adjacent staking faces to engage the upstanding edges of the side walls of the groove and deform or stake them into cap-retaining position to an extent limited by the bottoming of the land against the seated cap. The spacing of the guideways provides for staking the body at spaced areas along the length of the groove. Caps may be retained by a limited number of repeated stakings in those same areas, and the lock body can be positioned in the capping block in different positions so that additional stakings can be done at different sets of areas along the groove. This permits repeated removal and replacement of caps to accommodate repeated recombinating of the lock more than enough times to meet normal requirements.

The accompanying drawings illustrate the invention and show an embodiment of the invention exemplifying the best mode of carrying out the invention as presently perceived. In such drawings.

Figure 1:
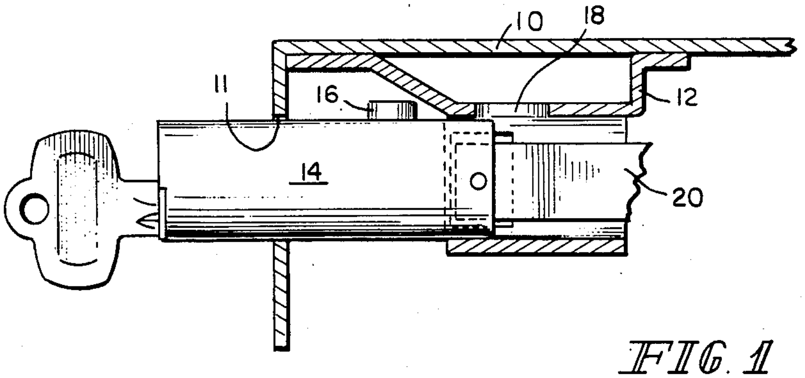
FIG. 1 is a vertical sectional view of a portion of a cabinet fitted with a cabinet push lock in accordance with the present inveniton.

The lock mechanism shown in FIGS. 1–4 comprises a cabinet 10 provided with a front lock opening 11 and a fitting 12 for the reception of a cabinet push lock 14. Such lock has a yieldingly retractable bolt 16 which, when the lock 14 is pushed inward, engages in a keeper opening 18 in the fitting 12. The lock 14 is connected to an operating bar 20 which actuates conventional mechanism to lock the cabinet when the lock 14 is thus pushed inward.

Figure 2:
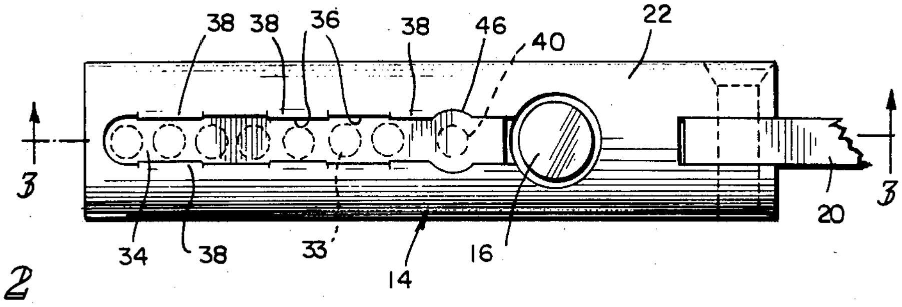
FIG. 2 is a top elevation of the cabinet lock shown in FIG. 1, on an enlarged scale.
Figure 3:
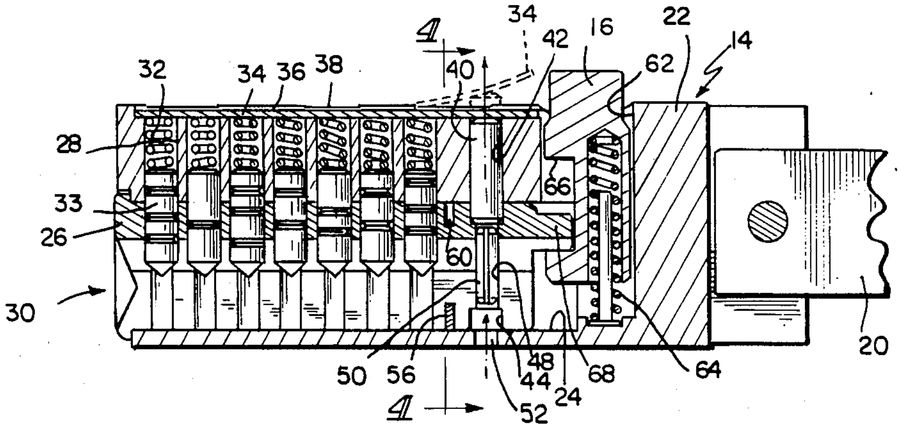
FIG. 3 is a longitudinal vertical section taken on the line 3—3 of FIG. 2.
Figure 4:
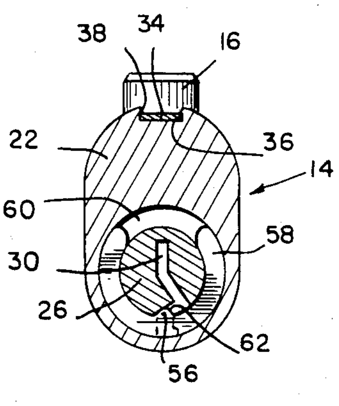
FIG. 4 is a transverse vertical section taken on the line 4—4 of FIG. 3.

As shown in FIGS. 2–4, the lock 14 comprises an elongated body 22 of generally oval and uniform cross section formed with a longitudinal bore 24 for the reception of a key plug 26. A series of pin tumbler bores 28, here shown as seven such bores, extend in a common plane from the plug bore 24 up through the top rounded surface of the body. The key plug 26 contains a key slot 30, and the pin tumbler bores 28 contain stacks of pin segments 33 which extend into aligned bores in the key plug and into such key slot, and are biased downward by springs 32 held in place by a cap 34.

The cap 34 is mounted in a longitudinal groove 36 which is closed at its front end and extends across the open ends of the pin tumbler bores and therebeyond to the position of the bolt 16. The cap is thinner than the height of the side walls of the groove 36, and is held in place by a series of inwardly staked portions 38 of such side walls at spaced points along the length of the groove. The cap fits closely in the groove, especially at its forward end which is at least partially exposed when the lock 14 is in unlocked position as shown in FIG. 1, so as to resist removal.

The key plug 26 is held in place in its bore 24 by a retainer pin 40 mounted in a bore 42 coplanar with the pin tumbler bores 28 and extending from the bottom of the cap groove 36 to the key plug bore 24. The key plug is formed with a circumferential groove 44 which receives the lower end of such retainer pin 40 so as to lock the key plug against axial movement in its bore. Preferably, and as shown, the cap groove 36 is formed with circular side pockets 46 at the position of the retainer pin 40, and the cap has side enlargements engaged therein, so as to position the cap 34 in proper orientation and lock it against axial movement.

The key plug 26 contains a diametric bore 48, normally in alignment with the retainer pin bore 40 and preferably in the plane of the key slot 30. An access opening 52 in the bottom of the lock body in alignment with the body bore 42 and the key plug bore 48 combines with such bores to define a passage for means to transmit thrust against the bottom of the cap 34. A drive pin 50 is desirably mounted in the key plug bore 48 below the bottom of the groove 44, and serves to block the key slot against insertion of a pick or other tool to actuate the bolt 16. It also forms a thrust-transmitting element for transmitting drive thrust against the retainer pin 40 so that the pins 40 and 50 provide means to drive at least the rear end of such cap upward out of the groove 36 so as to permit removal of the cap for purposes of recombinating the lock. In the arrangement shown, such thrust may be exerted by inserting a small punch into the bottom opening 52 against the drive pin 50, and thereby forcing the drive pin 50 against the retainer pin 40 and forcing such retainer pin against the bottom surface of the cap 36 to lift it out of its groove as indicated in dotted lines in FIG. 3.

The key plug is desirably also provided with a key stop 56 extending across the key slot 30 between the rear stack of tumbler pin segments and the circumferential groove 44 engaged by the retainer pin 40. Preferably and as shown, such key stop is part of a C-shaped snap-ring 58 which extends through an arc of more than 180° in a narrow circumferential groove 60 in the key plug, just ahead of the retainer groove 44, and is self-retaining in such groove.

The snap-ring is oriented against rotation in its groove by a detent boss 62 which extends inward from the C-shaped ring into the key slot as shown in FIG. 4.

As is customary, the bolt 16 is slidably mounted in a vertical pocket 62 in the lock body 22 and biased upward by a spring 64. The forward side of the bolt is formed with a cross slot 66 into which a crank pin 68 on the rear end of the key plug is engaged so that rotation of the key plug with an operating key will cause the crank pin 68 to retract the bolt 16 from its extended locking position to release it.

In the embodiment of claims 1–4, the bolt 16 is of cylindrical shape. Other shapes are commonly used, including an elongated shape such as that of the bolt 116 shown on the lock 14 in FIG. 5. The bolt 116 may have a cylindrical lower portion, identical with that of the bolt 16 shown in FIG. 3, but is provided with an elongated head 117 at its upper end. The body is accordingly modified to accept such elongated head by forming the body with a correspondingly elongated slot 163 in the upper portion of the lock body and of sufficient depth to allow full retraction of the elongated head 117 of the bolt 116.

A lock as shown may be assembled by first inserting a bolt 16 with its biasing spring 64 in the pocket 62 of the lock body, and then inserting a key plug 26, with a drive pin 50 and snap-ring 58 mounted therein, into the key plug bore 24 so as to engage the crank pin 68 of such key plug with the groove 66 of the bolt pin. A retaining pin 40 is then inserted in its bore 42 and into the circumferential groove 44 of the key plug 26 to retain that key plug in place. The assembled lock can then be combinated by inserting tumbler pin segments 33 in the tumbler pin bores 28, adding biasing springs 32, and applying a cap 34 in the cap groove 36, and deforming portions 38 of the walls of such groove into retaining engagement with the cap.

Figure 5:
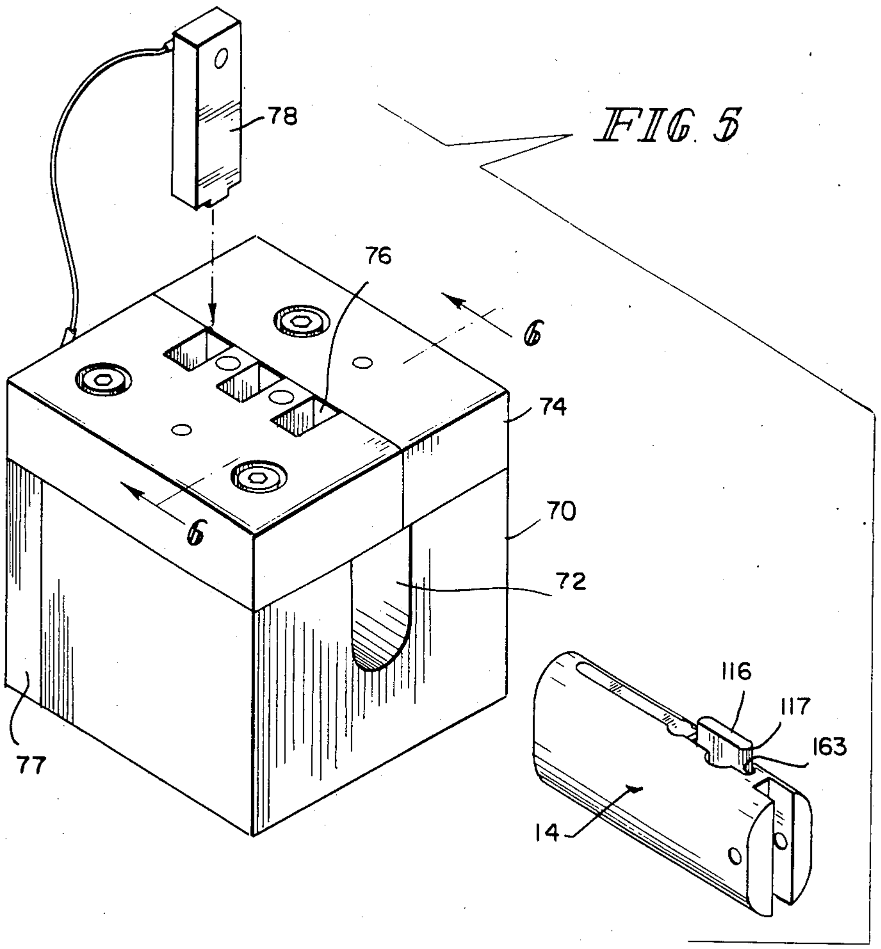
FIG. 5 is a perspective view of a capping tool in accordance with the invention.
Figure 6:
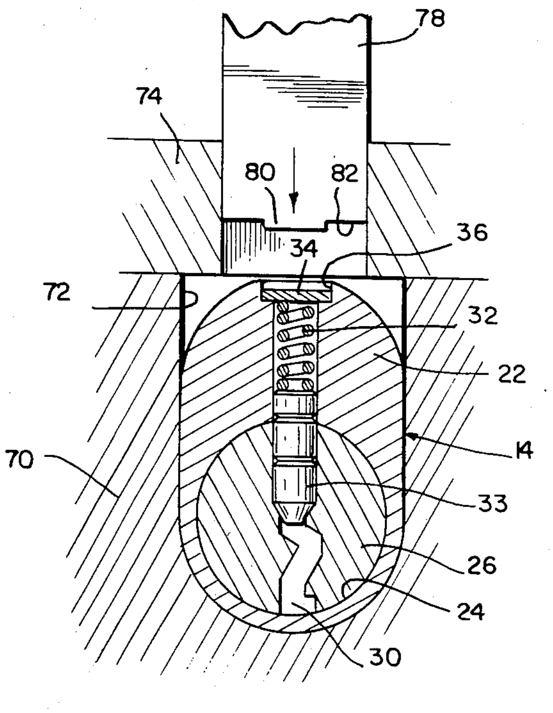
FIG. 6 is a section taken on the line 6—6 of FIG. 5.

The capping operation is conveniently carried out with a capping tool as shown in FIGS. 5 and 6. This comprises a capping block 70 formed with a longitudinal cavity 72 for the reception of a lock 14, a rear wall 77 forming a back stop at the rear of such cavity, and a cover plate 74 fixed to the block 70 and containing a series of spaced guideways 76 for a punch 78. As best shown in FIG. 6, the punch 78 is formed with a central land 80 adapted to enter the groove 36 and bear against the cap 34 therein to seat such cap in the bottom of the groove. The punch also has staking faces 82 adjacent the sides of the central land 80, in position to engage and deform inward the upstanding edges of the side walls of the groove so as to secure the cap 34 in the groove. Such deformation will be limited, since the land 80 will bottom out against the seated cap and thereby stop the movement of the staking faces 82. The punch 78 is driven successively against the top of the lock 14 in the manner indicated in FIG. 6 in each of the guideways 76 so as to stake and deform the side walls of the groove 36 at spaced points along is length, while leaving intermediate portions of such side walls untouched.

A plurality of punches 78 might be used simultaneously, as in the initial assembly and combinating of a lock at the factory, but the combinating tool shown is an effective simple tool adapted to be distributed to service personnel for recombinating locks 14 in the field.

For purposes of recombinating, the lock 14 is disconnected from the control bar 20 and removed from the cabinet. A small punch or the like is inserted through the hole 52 in the bottom of the lock body 22 and is forced against the drive pin 50 to drive it against the key plug retaining pin 40 so as to force that pin against the overlying portion of the cap 34 and force that portion out of the groove 36. The cap can then be grasped as with a pair of pliers and removed from the groove. The drive pin 50 and the retainer pin 40 are then desirably driven completely out of the lock, the existing pin segments removed, and the key plug 26 withdrawn from the body to permit the drive pin to be reinstalled in its diametric bore so that its ends are flush with or slightly below the bottom of the retainer groove 44. The plug 26 is then reinserted in the lock in proper engagement with the bolt 16, and the retainer pin 40 driven into its bore 42 and the key plug groove 44 until its upper end is flush with the bottom of the groove 36 in the core body. The lock is then recombinated in accordance with known practice by inserting appropriate pin segments 33 and biasing springs 32 in the pin tumbler bores. A fresh cap 34 is then placed in the groove 36 or in overlying relation with such groove, and this subassembly is inserted in the cavity 72 of the capping tool. The punch 78 is then preferably inserted in the center guideway 76 and successively in the other guideways 76 and gently tapped to drive the new cap into the slot 36. When the cap has been positioned in the groove, the punch 78 is then inserted into the guideways and driven with greater, but moderate, force to restake the side walls of the groove 36 into retaining engagement with the new cap 34. It has been found feasible to restake the groove walls in this way at the same locations a number of times, depending to some extent upon the care taken by the locksmith in performing previous combinating or recombinating procedures. If and when it becomes no longer possible to retain the cap by restaking the same areas along the length of the groove 36, the lock 14 can be positioned in the cavity 72 of the capping block 70 in different longitudinal positions, so that the capping tool 78 will engage fresh portions of the walls of the groove 36 to utilize such fresh portions for retaining the cap 34.

It is thus possible to readily recombinate and recap a cabinet push lock, and to do so repeatedly, in keeping with desired changes of other locks in the same system or subsystem.

What is claimed is:

1. In combination, a lock and lock capping tool, the combination comprising a lock body having a key plug bore and a plurality of pin tumbler bores extending therefrom to an exterior surface of the body, a cap-receiving groove in said surface and crossing said bores, a cap received in said groove for closing the outer ends of said bores, said groove having side walls of greater height than adjacent edges of the cap, said body including a passage terminating in said groove below said cap for the reception of means to lift at least a portion of said cap means out of the groove so as to permit removal of the cap to expose the bores for recombination, a capping tool including a staking punch having a central land adapted to enter said groove to seat the cap therein, and laterally adjacent staking faces adapted to produce limited deformation of said groove side walls into retaining engagement with the edges of the cap.

2. The combination of claim 1 in which said staking punch has a dimension longitudinally of the groove equal to not more than a small fraction of such length so as to be applicable to the lock body at spaced points along the groove and leave intermediate areas for staking in subsequent capping operations.

3. The combination of claim 1 in which said capping tool includes a capping block defining a cavity for reception of a lock body and cap assembly, said block having guideways spaced longitudinally of the lock body assembly for guiding the staking punch into operative engagement with the cap and body at longitudinally spaced points, so as to stake said groove said walls at spaced points and leave intermediate areas for staking in subsequent capping operations.

4. In combination, a lock and lock capping tool, the combination comprising a lock body including an exterior surface and a pair of spaced-apart side walls, and formed to include a key plug bore, a cap-receiving groove situated between the side walls and having an opening in the exterior surface, and a plurality of pin tumbler bores extending from the key plug bore to the cap-receiving groove, a cap situated in the groove for closing the outer ends of the pin tumbler bores opening into the groove, means in the lock body for selectively moving at least a portion of the cap out of the groove, thereby permitting removal of the cap to expose the pin tumbler bores for recombination, and a capping tool having a staking punch including means for seating the cap in the groove and means for staking the side walls of the groove when the cap is seated therein to retain the cap in a secured position.

5. The combination of claim 4, wherein each side wall includes an upstanding edge and the staking means includes a pair of spaced-apart staking faces for deforming the upstanding edges of the side walls of the groove thus securing the cap in the groove.

6. The combination of claim 4, wherein the lock body includes ledge means for supporting the cap in a mounted position within the groove and the seating means includes a central land having a cap-engaging surface projectable into the groove to bear against the cap thereby seating the cap on the ledge means.

7. The combination of claim 6, wherein each side wall includes an upstanding edge and the staking means includes a pair of spaced-apart staking faces for deforming the upstanding edges of the side walls of the groove thus securing the cap in the groove, the central land projecting downwardly beyond the staking faces to position the cap-engaging surface of the central land in spaced-relation to the staking faces to bottom out the cap-engaging surface against the seated cap on the ledge means to stop further movement of the staking faces thus controlling deformation of the upstanding edges.

8. The combination of claim 4, wherein the staking punch has a dimension longitudinally of the groove equal to not more than a small fraction of such length so as to be applicable to the lock body at spaced points along the groove and leave intermediate areas for staking in subsequent capping operations.

9. The combination of claim 4, wherein the capping tool further includes a capping block defining a cavity for the reception of a lock body and cap assembly, the block having guideways spaced longitudinally of the lock body assembly for guiding the staking punch into operative engagement with the cap and body at longitudinally spaced points, so as to stake the groove side walls at spaced points and leave intermediate areas for staking in subsequent capping operations.

10. In combination, a lock and lock capping tool, the combination comprising a lock body including an exterior surface, a key plug bore, a pair of spaced-apart side walls defining a cap-receiving groove having an opening in the exterior surface, and a plurality of pin tumbler bores interconnecting the key plug bore and the cap-receiving groove, a cap in the groove for closing one end of the pin tumbler bores, means in the lock body for selectively moving at least a portion of the cap out of the groove, thereby permitting removal of the cap to expose the pin tumbler bores for recombination, and a capping tool having a punch including staking means for deforming the side walls of the groove to a selected depth when the cap is in the groove to retain the cap in a secured position and limit means for controlling the depth to which the side walls are deformed during operation of the staking means.

11. The combination of claim 10, wherein each side wall includes an upstanding edge and the staking means includes a pair of spaced-apart staking forces for deforming the upstanding edges of the side walls of the groove thus securing the cap in the groove.

12. The combination of claim 10, wherein the lock body further includes ledge means for supporting the cap in a mounted position within the groove and the limit means includes a central land having a cap-engaging surface projectable into the groove to bear against the cap thereby seating the cap on the ledge means.

13. The combination of claim 10, wherein each side wall includes an upstanding ledge and the staking means includes a pair of spaced-apart staking faces for deforming the upstanding edges of the side walls of the groove thus securing the cap in the groove and a central land projecting downwardly beyond the staking force to position the cap-engaging surface of the central land in spaced-relation to the staking faces to bottom out the cap-engaging surface against the seated cap on the ledge means to stop further movement of the staking faces thus controlling deformation of the upstanding edges.

14. The combination of claim 10, wherein the staking punch has a dimension longitudinally of the groove equal to not more than a small fraction of such length so as to be applicable to the lock body at spaced points along the groove and leave intermediate areas for staking in subsequent capping operations.

15. The combination of claim 10, wherein the capping tool further includes a capping block defining a cavity for reception of a lock body and cap assembly, the block having guideways spaced longitudinally of the lock body assembly for guiding the staking punch into operative engagement with the cap and body at longitudinally spaced points so as to stake said groove side walls at spaced points and leave intermediate areas for staking and subsequent capping operations.

* * * * *